W. J. WINSTON.
CLAMPING DEVICE FOR KEY SEATING MACHINES.
APPLICATION FILED APR. 25, 1914.
1,111,203.
Patented Sept. 22, 1914.
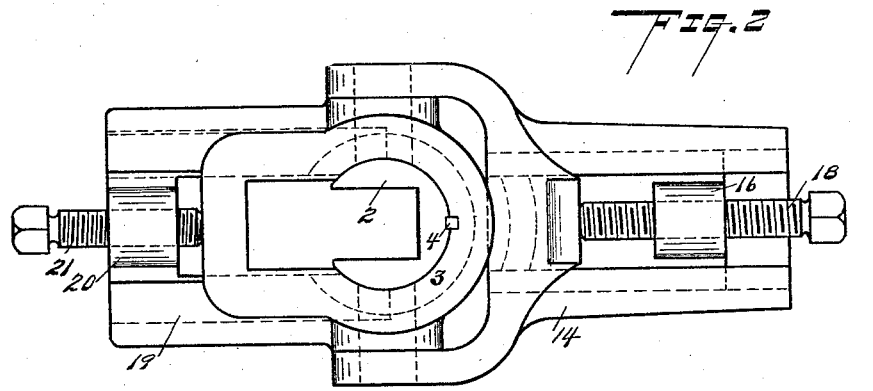
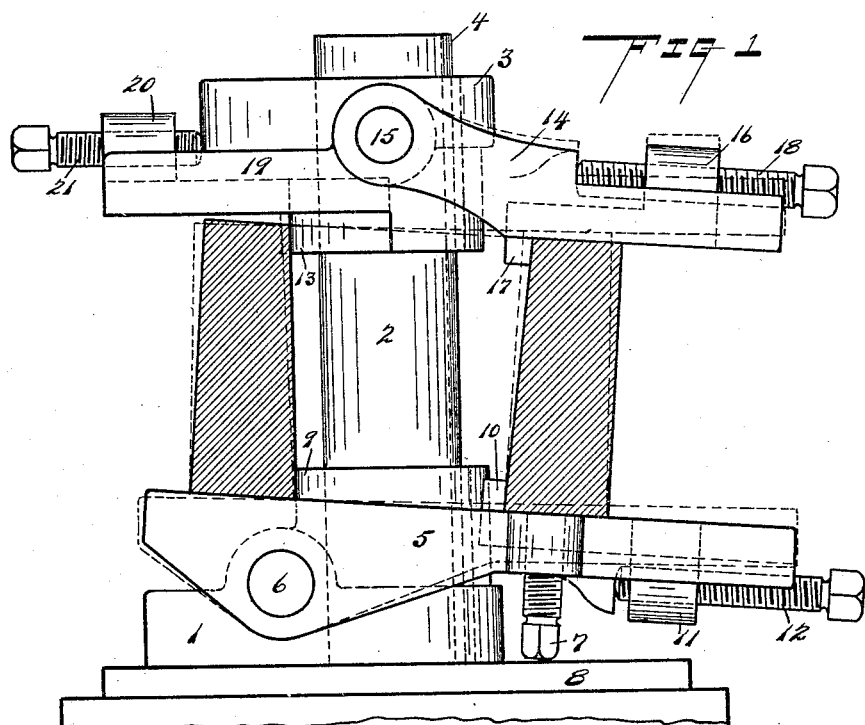
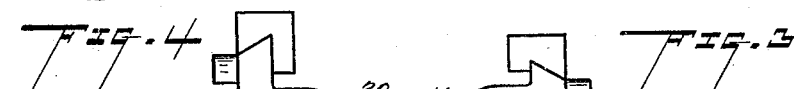
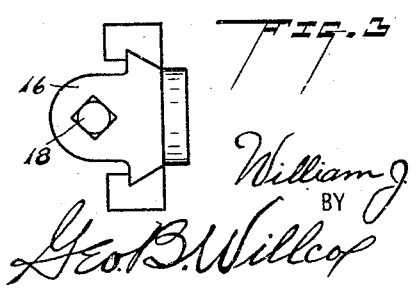
WITNESSES:
Roy Wallis
Nellie M. Angus
INVENTOR
William J. Winston
BY
Geo. B. Willcox
ATTORNEY

UNITED STATES PATENT OFFICE.

WILLIAM JOSEPH WINSTON, OF SAGINAW, MICHIGAN, ASSIGNOR TO MITTS & MERRILL, OF SAGINAW, MICHIGAN, A CORPORATION.

CLAMPING DEVICE FOR KEY-SEATING MACHINES.

1,111,203.   Specification of Letters Patent.   Patented Sept. 22, 1914.

Application filed April 25, 1914. Serial No. 834,382.

*To all whom it may concern:*

Be it known that I, WILLIAM JOSEPH WINSTON, a citizen of the United States, residing at Saginaw, in the county of Saginaw and State of Michigan, have invented certain new and useful Improvements in Clamping Devices for Key-Seating Machines; and I do hereby declare the following to be a full, clear, and exact description of the invention, such as will enable others skilled in the art to which it appertains to make and use the same.

This invention relates to keyseating or broaching machines and pertains more particularly to devices for clamping the work to the work tables of such machines.

My invention pertains especially to clamping devices adapted to be used for clamping hubs and similar articles to be keyseated, the hubs being formed with either cylindrical or tapered bore, and the keyways to be either of uniform depth or tapered, as the nature of the work may require.

One object of my invention is to provide a tilting work table with means for adjusting its amount of inclination and means for clamping the work to the tilting table.

A further object is to provide a clamping device for the upper end of the work, the clamping device being capable of adjustment longitudinally to suit work of various height, and being also provided with an adjustable clamping member adapted to be adjusted angularly in a vertical plane as well as vertically to properly clamp the upper end of work that varies in height or requires to be held in a tilted position.

A still further object is to provide an adjustment by which the variation in depth of the keyway from one end to the other may be regulated.

With these and certain other objects in view which will appear later in the specification, my invention comprises the devices described and claimed and the equivalents thereof.

In the drawings, Figure 1 is a side elevation of my work-clamping device applied to the grooved post of a keyseating machine, a piece of work representing a hub with a tapered bore being shown in cross section between the clamps. Fig. 2 is a top plan view of the parts shown in Fig. 1. Fig. 3 is an end view of one of the slides of the upper clamp. Fig. 4 is an end view of the opposite slide of the same clamp.

As is clearly shown in the drawings, the device consists of a lower stationary collar 1 fitted over the usual grooved tool post 2 of the keyseating machine, and 3 is an upper collar similarly fitted to the post 2 and vertically slidable thereon, being guided by a vertical key 4 carried by the post. To the base of the lower collar 1 a tiltable work table 5 is secured by means of trunnions 6. The inclination of the table is controlled by means of a set screw 7 threaded into the table 5 and having its head resting on the frame or bed 8 of the keyseating machine. When the work is in place on the table, one of its sides bears against the face of the lower collar 1, as at 9, and the face of the work at the opposite diameter is clamped to the work table 5 by means of a lug 10 carried by a suitable slide 11 and adapted to be drawn outward by means of the set screw 12 carried by the table 5.

The lower end of any piece of work within the capacity of the machine may be clamped in the manner illustrated in Fig. 1. To clamp the upper end of the piece of work, the upper collar 3 is provided with a bearing member 13, adjacent which the upper bore of the work rests while the keyway is being cut. To properly clamp the upper end of the piece of work at the opposite side from the bearing member 13, and to admit of clamping taper-bored pieces, a bracket 14 is mounted on the upper collar 3 by means of trunnions 15, and an adjustable slide 16, carrying a clamping lug or member 17 is mounted on the bracket. The lug is radially adjustable, the adjustment being effected by means of set screw 18 carried by the bracket 14. By properly adjusting the set screw 18, the lug 17 is caused to clamp the work tightly against the bearing member 13. Where the work has a tapered bore, as shown in Fig. 1, the pivoted bracket 14 is readily adjusted to suit the inclination of the upper face of the work. So far the clamping device has been described in the form adapted for the cutting of a keyway of uniform depth throughout its length.

I also provide means whereby keyways of varying depth throughout their lengths may be formed. For example, if it is desired to cut a keyway of less depth at its upper end *i. e.* near the bearing member 13, than at its lower end near the bearing point 9, I adjust the bearing member 13 to a position farther out from the side of the post 2. To provide such radial adjustment of the bearing member 13, I prefer to mount on the upper collar 3 a slide 19, the lower part of which forms when closed a part of the upper collar 3, as shown in Fig. 1. This lower part of the slide 19 comprises the bearing member 13. To adjust this bearing member, its slide 19 is provided with a threaded boss 20, and a set screw 21 is threaded into the boss and bears against the side of the collar 3, so that the set screw when tightened will draw the bearing member 13 to the left in Fig. 1, thereby causing a shallower keyway to be formed at the upper end than at the lower end of the work.

By the means above described, I have produced a simple, yet powerful and effective clamping device for holding the work to the work table of keyseating and similar machines, the clamping device being adapted to hold work of various diameters of bore, either straight or tapered, and of various heights, and also to hold any of the above classes of work in such a manner that keyways may be formed in them either of uniform depth or of varying depth throughout their length.

Although I have shown and described my improvement as applied to a vertical keyseating machine, it will be understood that it is equally well adapted for use with horizontal broaching machines and other machines of like character, and I do not desire to confine the application of my invention to the keyseating machine herein referred to.

Having thus described my invention, what I claim and desire to secure by Letters Patent is:

1. A work clamping device for keyseating machines and the like, comprising a post, a tiltable work table having an adjustable clamping lug thereon, an adjustable collar slidably mounted on the post of said machine, a bracket pivoted to said collar, a clamping member movably mounted on said bracket, and means for moving said clamping member along said bracket, for the purposes set forth.

2. In a work-holder for keyseating machines and the like, the combination with a post, a tiltable table and clamping devices carried thereon, of an adjustable collar carried by the post of said machine, a bracket hinged to said collar, a clamping member adjustably mounted on said bracket, means for adjusting said clamping member, an oppositely located bearing member carried by said collar and having means whereby said bearing member may be variously positioned with relation to said post.

3. A work clamping device for keyseating machines and the like, comprising a post, a work table, and means for clamping work thereon, an adjustable collar slidably mounted on the post of said machine, a bracket pivoted to said collar, a clamping member movably mounted on said bracket, and means for moving said clamping member along said bracket.

4. In a work holder for keyseating machines and the like, the combination with a collar, a post, a tiltable table secured thereto and clamping devices carried on said table, of an adjustable collar carried by the post of said machine, a bracket hinged to said collar, a clamping member adjustably mounted on said bracket, means for adjusting said clamping member, an oppositely located bearing member carried by one of said collars and having means whereby said bearing member may be variously positioned with relation to said post.

In testimony whereof, I affix my signature in presence of two witnesses.

WILLIAM JOSEPH WINSTON.

Witnesses:
NELLIE M. ANGUS,
JOSEPH V. CARPENTER.